March 17, 1942.  J. F. GRIFFIN  2,276,963
FUEL TANK
Filed Feb. 13, 1940
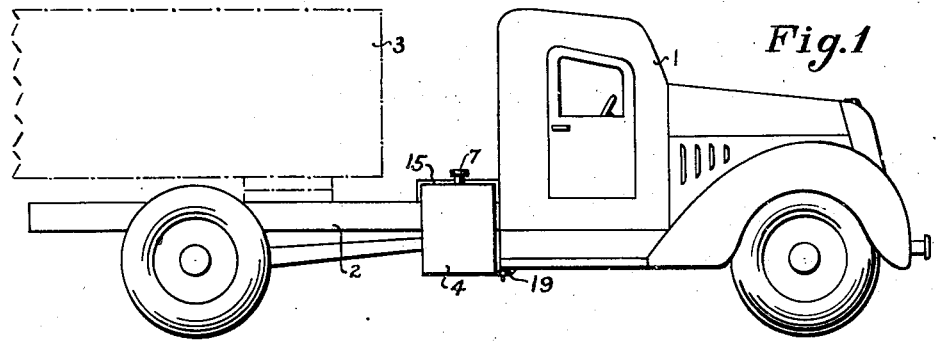
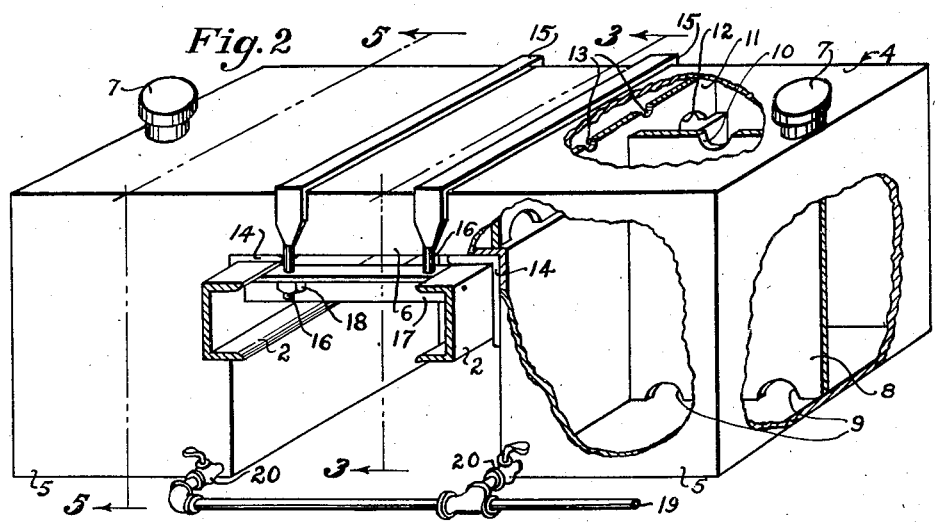
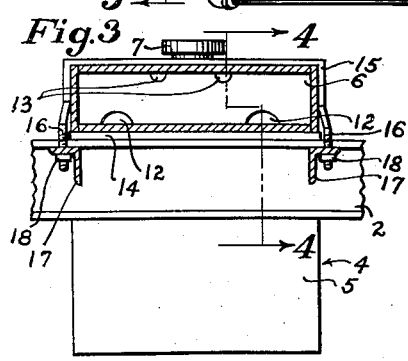
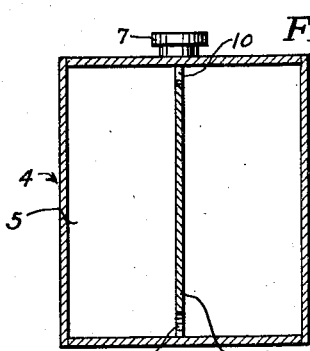
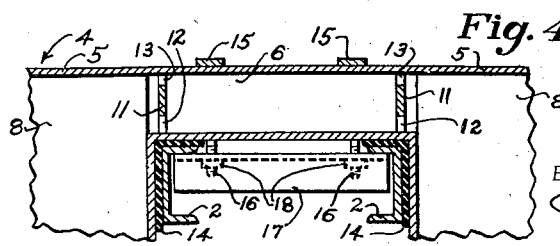
James F. Griffin
INVENTOR.
BY *J. Preston Swecker*
his ATTORNEY.

Patented Mar. 17, 1942

2,276,963

UNITED STATES PATENT OFFICE 2,276,963

FUEL TANK

James F. Griffin, Dallas, Tex.

Application February 13, 1940, Serial No. 318,754

8 Claims. (Cl. 280—5)

This invention relates to an improvement in fuel tanks for motor vehicles, particularly for trucks which require large capacity for a substantial quantity of fuel necessary when the truck is hauling over long distances.

Heretofore, many types of tanks have been proposed for the purpose of carrying additional fuel in motor vehicles, such as trucks, but these fuel tanks have not been satisfactory to the motoring public or to the operators of transportation lines, due to their inaccessibility, to the impractical mounting of them on the trucks, especially when they utilized valuable space therein, and to the difficulty encountered in filling such tanks. These objections have been particularly felt where the truck is used for hauling trailers or trailer bodies.

The object of this invention is to provide a fuel tank of maximum capacity, that may be filled from either side of the truck without difficulty, that may be simply and readily applied to the truck without interference with the load and in a minimum of space.

This object is accomplished primarily by the construction of the tank generally in saddle shape, so that it may extend to opposite sides of the chassis frame and may be mounted thereon without the necessity for drilling special holes, welding lugs, or otherwise altering the frame, and yet when it is secured in place, it is permanently fastened against danger of accidental displacement.

A preferred embodiment of this invention is illustrated in the accompanying drawing, in which:

Fig. 1 is a side elevation of a motor truck showing the invention applied thereto;

Fig. 2 is a perspective view of the fuel tank in place on the chassis frame, parts being broken away and in section;

Fig. 3 is a transverse sectional view through the mid-portion of the tank, substantially on the line 3—3 of Fig. 2;

Fig. 4 is a similar view at right angles thereto on the line 4—4 of Fig. 3; and

Fig. 5 is a transverse sectional view through one of the tank compartments, on the line 5—5 of Fig. 2.

The invention is shown in Fig. 1, as applied to the conventional form of motor vehicle truck designated generally by the numeral 1, having the usual wheeled chassis frame 2, and the truck here illustrated is of the form used for hauling a trailer body, designated generally by the numeral 3, and the front end portion of which is adapted to overlie and be mounted upon the chassis frame 2.

The chassis frame 2 is usually constructed of a pair of opposed channel bars spaced apart, substantially as shown in Fig. 2, and the fuel tank designated generally by the numeral 4, is constructed to be mounted upon the chassis frame 2 and to straddle the same substantially in the manner of a saddle.

As thus constructed, the tank 4 is provided with a pair of end compartments or receptacles 5 joined together by a shallow connecting passageway or top compartment 6, which extends between the upper portions of the compartments 5, as shown in Fig. 4, and is in open communication therewith. Each of the compartments 5 is provided with a capped filling opening 7 through which fuel may be introduced, whereby the tank may be filled from either side and when the adjacent compartment fills up to the level of the communicating passage 6, the fuel will flow therethrough into the opposite compartment until it is full also, whereby both of the compartments may be filled through either of the openings 7.

Vertical baffles 8 are provided in the end compartments 5, extending lengthwise of the fuel tank approximately midway of the width of the compartments, to prevent splashing of the liquid in the tank due to forward or backward motion of the truck. Each of these baffles 8 is provided with openings 9 in the lower edges thereof to permit open communication between opposite sides of the baffle, so as to permit normal flow of fuel from one side to the other thereof in the compartment. A vent 10 is also formed in the upper edge portion of each baffle 8 for freedom of flow of gas and air between opposite sides thereof, to prevent gas lock of the fuel.

Similar baffles 11 are provided in opposite ends of the communicating passage 6 to prevent accidental splashing of fuel from one compartment to the other. The baffles 11 extend vertically in the passage 6, but have openings 12 in the lower edges thereof to permit normal flow of fuel therethrough. Gas vents 13 are formed in the upper edges of the baffles 11.

It will be noted that the fuel tank is constructed generally of inverted U-shape so as to straddle the chassis frame 2 and be seated thereon. Cushions 14, preferably of soft rubber or felt, are interposed between the fuel tank 4 and the chassis frame 2, as shown in Figs. 2 and 4, and upon which cushions 14, the tank is seated. For anchoring the fuel tank to the chassis frame, tie bars 15 extend transversely over the tank adjacent opposite ends of the passage 6, and the opposite ends of the tie bars 15 are reduced to form threaded pins 16, which extend through cross bars 17 that extend transversely between the channel bars forming the chassis frame and have the opposite ends of the cross bars 17 interfitting with the channels and engaging under the upper flanges thereof. Each of the cross bars 17 is preferably formed in the shape of an angle bar that has an out-turned flange through which the pins 16 extend and which are locked in place by nuts 18 threaded thereon. The bridging relation of the cross bars 17 between the chassis frame, securely anchors the tie bars 15 thereto for effectively holding the fuel tank in a firm seated position on the chassis frame. This construction permits ready attachment or detachment of the fuel tank to the frame of the truck, whereby it may supplement the main fuel tank or replace the same, as may be desired.

Both of the compartments 5 are preferably connected with a fuel line 19 through control valves 20, either or both of which may be opened for selectively or simultaneously removing the fuel from the compartments under the control of the operator. If desired, the operator may open only one of the valves 20 to use the fuel from the corresponding compartment and retain the fuel in the other compartment as a reserve supply thereby preventing inadvertent exhaustion of the fuel.

The fuel tank is preferably constructed to fit vehicle frames of standard sizes and widths, and is detachably mounted thereon, preferably just behind the cab as illustrated, in which event the tank may be transferred from one vehicle to the other for reattachment thereon without requiring alteration in the construction or chassis, and when used, it forms a main or standard fuel supply of substantial capacity, fulfilling the requirements even of trucks used in transportation lines traveling over substantial distances.

I claim:

1. In a motor vehicle, the combination with a chassis frame having opposed channel bars, a fuel tank mounted on the chassis frame, tie rods extending transversely over the fuel tank substantially parallel with the channel bars, and cross bars secured to the tie rods and extending transversely between the channel bars with the ends of said cross bars engaging under flanges of the channel bars for anchoring the receptacle in place thereon.

2. In a motor vehicle, the combination with a chassis frame having opposed channel bars, an inverted U-shaped fuel tank elongated transversely of and embracing the chassis frame and seated thereon, cross bars extending transversely between the side bars of the chassis frame and engaging under flanges thereof, and tie rods extending transversely over the fuel tank with the ends thereof secured to the cross bars for securely anchoring the fuel tank in place on the chassis frame.

3. In a motor vehicle, the combination of a self-propelled motor vehicle chassis having an elongated chassis frame extending lengthwise thereof, a fuel supply tank for said motor vehicle and mounted on said chassis frame, said tank being elongated transversely of the chassis frame and constructed of relatively deep end compartments having a connecting portion therebetween with a relatively shallow passageway therein between the end compartments, said tank being constructed with the length thereof transversely of the chassis appreciably greater than the width of the tank lengthwise of the chassis.

4. In a motor vehicle, the combination of a self-propelled motor vehicle chassis having an elongated chassis frame extending lengthwise thereof, a fuel supply tank for said motor vehicle and mounted on said chassis frame, said tank being elongated transversely of the chassis frame and constructed of relatively deep end compartments having a connecting portion therebetween with a relatively shallow passageway therein between the end compartments, said tank being constructed with the length thereof transversely of the chassis appreciably greater than the width of the tank lengthwise of the chassis and having the major portion of the height thereof below the upper edge of the chassis frame, whereby the tank is disposed beneath a load supported on the chassis.

5. In a motor vehicle, the combination of a self-propelled motor vehicle chassis having an elongated chassis frame extending lengthwise thereof, a fuel supply tank for said motor vehicle and mounted on said chassis frame, said tank being elongated transversely of the chassis frame and constructed of relatively deep end compartments having a connecting portion therebetween with a relatively shallow passageway therein between the end compartments, said tank being constructed with the length thereof transversely of the chassis appreciably greater than the width of the tank lengthwise of the chassis and having the major portion of the height thereof below the upper edge of the chassis frame, whereby the tank is disposed beneath a load supported on the chassis, and a fuel line for the motor vehicle connected with each of the end compartments to receive fuel therefrom adjacent the bottom thereof appreciably below the top of the chassis frame.

6. In a motor vehicle, the combination of a self-propelled motor vehicle chassis having an elongated chassis frame extending lengthwise thereof, a fuel supply tank for said motor vehicle and mounted on said chassis frame, said tank being elongated transversely of the chassis frame, tie rods extending transversely over the fuel tank substantially parallel with the chassis frame, a cross bar secured directly to each opposite ends of the tie rods and extending transversely of the chassis frame, the cross bars having the ends thereof engaging under portions of the chassis frame whereby the pull of the tie rods holds the cross bars engaged with the chassis frame and secures the tie rods thereto.

7. In a motor vehicle, the combination of a self-propelled motor vehicle chassis having an elongated chassis frame with laterally spaced side bars, a fuel supply tank for said motor vehicle, said tank being elongated transversely of the chassis frame and constructed of a shallow top compartment with deep end compartments on opposite sides of the chassis frame, said shallow top compartment having a bottom seated directly on the chassis frame side bars and having a flat top extending of the same uniform height over the end compartments, and means connected with said tank for supplying fuel therefrom to the motor vehicle.

8. In a motor vehicle, the combination of a self-propelled motor vehicle chassis having an elongated chassis frame with laterally spaced side bars, a fuel supply tank for said motor vehicle, said tank being elongated transversely of the chassis frame and constructed of a shallow top compartment with deep end compartments on opposite sides of the chassis frame, said shallow top compartment having a bottom seated directly on the chassis frame side bars and having a flat top extending of the same uniform height over the end compartments, said tank having the opposite sides of the shallow top compartment in the same transverse planes as the corresponding sides of the end compartments, and said end compartments extending below the upper edges of the chassis frame a materially greater distance than the height of the top compartment thereabove to lower the center of weight relative thereto, and means connected with said tank for supplying fuel therefrom to the motor vehicle.

JAMES F. GRIFFIN.